Dec. 22, 1925.
L. BURGESS
1,566,269
PRODUCTION OF ALUMINUM CHLORIDE
Filed July 27, 1921
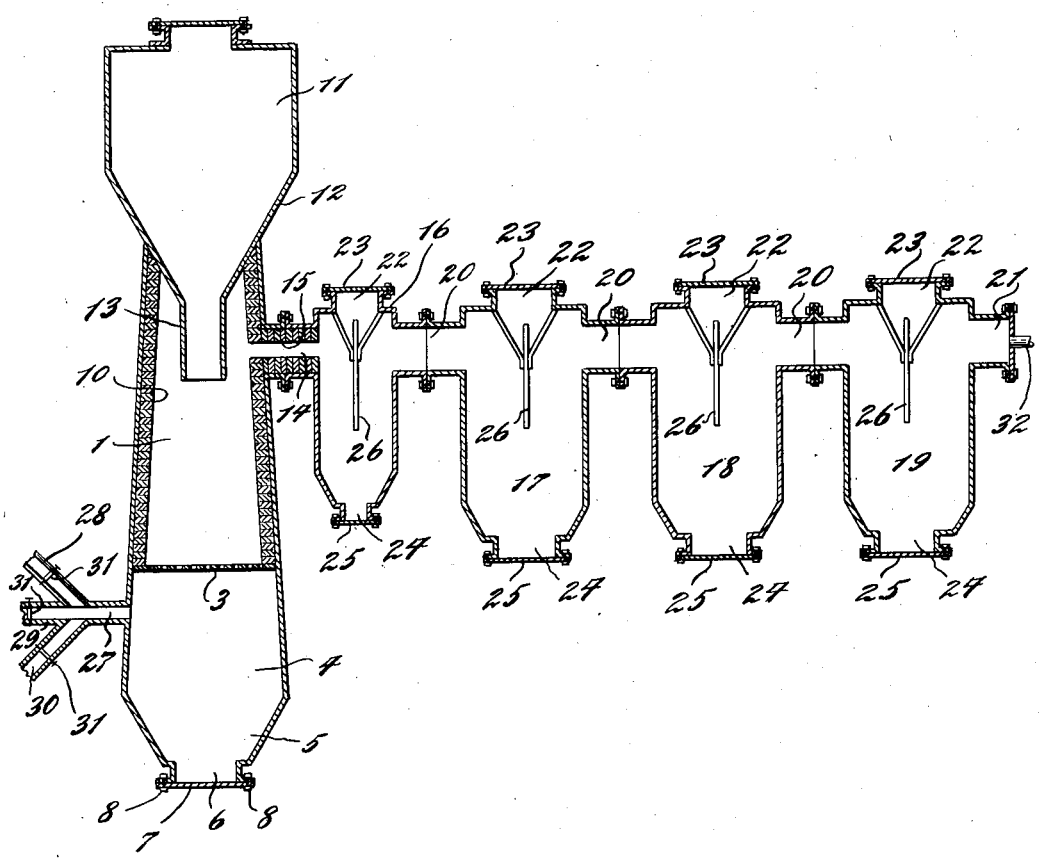
Louis Burgess   INVENTOR.
BY
Gifford & Bull   *his* ATTORNEYS Patented Dec. 22, 1925.

1,566,269

UNITED STATES PATENT OFFICE.

LOUIS BURGESS, OF BAYONNE, NEW JERSEY, ASSIGNOR, BY MESNE ASSIGNMENTS, TO HIMSELF AND MAURICE BARNETT.

PRODUCTION OF ALUMINUM CHLORIDE.

Application filed July 27, 1921. Serial No. 487,924.

*To all whom it may concern:*

Be it known that I, LOUIS BURGESS, a citizen of the United States, residing at Bayonne, in the county of Hudson and State of New Jersey, have invented certain new and useful Improvements in the Production of Aluminum Chloride, of which the following is a specification.

My invention relates to new and useful improvements in methods for the production of aluminum chloride, and particularly contemplates the treatment of aluminum silicid, or alloys, or mixtures embodying the same with hydrochloric acid gas under conditions resulting in a reaction producing aluminum chloride as one of the products. In such treatment the reaction which takes place is expressed by the following formula:

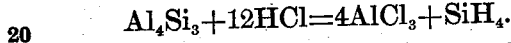

$Al_4Si_3 + 12HCl = 4AlCl_3 + SiH_4.$

Other hydrides of silicon may also be formed.

In my copending application, Serial No. 409,589, filed September 11, 1920, I have described a reduction process for certain metal oxids by means of an electric furnace, and among the several treatments or reductions described is included that of bauxite which, in its anhydrous condition, contains about 78% of alumina or aluminum oxid ($Al_2O_3$) and about 19% of silica ($SiO_2$). In said application I have described the reduction of bauxite with the theoretical amount of carbon necessary to reduce the aluminum and silicon to elemental form— that is, approximately 76 parts by weight of substantially anhydrous bauxite to 24 parts of carbon—the resulting product being aluminum silicid ($Al_4Si_3$) and elemental aluminum. I have also described in said prior application the reduction of bauxite employing more than the theoretical amount of carbon to reduce all the aluminum and silicon to elemental form, using, for example, 73 parts by weight of substantially anhydrous bauxite to 27 parts of carbon, in which case a mixture is produced including aluminum silicid ($Al_4Si_3$), elemental aluminum, aluminum carbid ($Al_4C_3$) and silicon carbid (SiC). My present invention is applicable to, and includes, the products resulting from the two examples above given, as furnishing the aluminum silicid, or alloy, or compound, or mixture thereof, to be reacted upon by hydrochloric acid gas to produce aluminum chloride ($AlCl_3$).

In the accompanying drawings I have shown in elevation and vertical section one form of apparatus adapted to carry out my present invention, but I desire it understood that other apparatuses may be employed without departing from the scope of my invention.

Referring to said drawings by characters of reference—

1 designates a reaction chamber or furnace, the same preferably comprising a vertically disposed shell or stack preferably constructed of steel, and the interior of which is divided by a horizontal open-work partition or grate 3 to form said chamber 1, and a lower chamber 4. The base or lower end of the stack is provided with a collection pocket 5 having a discharge opening 6, provided with a closure plate 7, detachably held in position to close the opening 6, by any suitable means, such as clamping bolts 8 passed through said plate and a flange on the lower end of the stack.

Above the partition or grate 3 the portion of the stack surrounding the reaction chamber is lined with firebrick 10, or other suitable refractory material which will withstand the heat conditions and the requirements of the reaction. The upper portion of the stack is provided with a supply hopper 11, of any suitable form and construction, and preferably provided with a funnel-shaped bottom 12 from which leads a supply-spout 13 opening downward into the reaction chamber 1. This hopper 11 is adapted to contain the aluminum silicid material employed and to feed the same to the reaction chamber 1.

Leading from the reaction chamber, and preferably from the upper portion of the latter, is an outlet duct 14, also preferably lined with refractory material 15, said duct being arranged to discharge volatile reaction products from the reaction chamber 1 into an initial condenser 16, constituting the first of a series of condensers, the remaining ones being shown at 17, 18 and 19, respectively. The condensers are connected at the upper portions thereof by ducts 20, by means of which volatile products not condensed in one condenser are discharged into the next condenser in the series, the final condenser 19 having a discharge duct 21 leading to any desired point. Each of the condensers may be provided at its upper portion with a manhole 22, closed by a suitable detachable cover-plate 23, while the lower portion of each condenser may be provided with a discharge opening 24, closed by a detachable cover-plate 25.

Within the condensers may be provided interceptors, in the form of vertical baffle-plates 26, arranged to intercept the incoming volatile material and cause it to circulate within the condensers and thereby produce efficient condensation. The interceptors also prevent the volatile products flowing directly from the inlet to and through an outlet without being detained in a condenser for a sufficient length of time under the condensing conditions.

The furnace chamber 4 is provided with an inlet duct 27 having three branches 28, 29, 30, respectively, having suitable control valves 31, all for a purpose to be presently set forth.

According to my invention, the reaction may be performed in either of the following ways:

First: The aluminum silicid or aluminum silicid-bearing material is placed in the hopper 11 and fed into the reaction chamber 1 through the spout 13, within which it is supported upon the open-work partition or grate 3. Dry hydrochloric acid gas is then fed through one of the pipes opening into the chamber 4, for instance, the pipe 28, the valves 31 in the pipes 29 and 30 being closed. The hydrochloric acid gas passes into the chamber 4 and up through the partition 3 into the reaction chamber 1 in contact with the aluminum silicid material therein. The reaction may then be initiated by any suitable application of heat, for example, by employment of electric heat supplied from arc electrodes (not shown), or any other means capable of furnishing sufficient preliminary heat to initiate the reaction. After the reaction between the hydrochloric acid and the aluminum silicid material has begun, the preliminary heating means may be discontinued, and the reaction will continue by the heat which is generated exothermically. As the result of the reaction volatile aluminum chlorid vapors are formed which pass out of the chamber through the duct 14, and are recovered in a manner to be presently described.

Second: Instead of initiating the reaction as above described, I may place within the reaction chamber and upon the grate 3 suitable combustion material, for example, coal or coke (preferably petroleum coke). This combustion material is ignited, in any suitable manner, air for combustion being supplied, in any suitable manner, for example, through the pipe 29, the combustion being continued until the furnace lining in the fire-bed is heated sufficiently, say, to a red, yellow, or even a white heat. The combustion air supplied through the pipe 29 is then cut off, and the products of combustion in the reaction chamber are displaced by admitting through the pipe 30 a suitable gas, such, for example, as hydrogen, natural gas, still gas, or any hydrocarbon gas, these being non-reactive with aluminum silicid. After the products of combustion are displaced, the gas fed through the pipe 30 is cut off and the aluminum silicid material is dumped into the reaction chamber, and a supply of dry hydrochloric acid gas turned on by opening the valve 31 in the pipe 28. The heat of the furnace lining and the glowing bed of combustion material on the open-work partition 3 is sufficient to initiate the reaction between the aluminum silicid material and the hydrochloric acid gas, which reaction continues as long as said material and gas are present in proper proportions.

In carrying out the reaction it is preferable that the heat maintained in the retort be sufficiently high to volatilize any other chlorides, such as ferrous chloride, which may be formed, in order that the same may be carried out of the reaction zone and separated from the aluminum chloride. This is desirable, in view of the fact that if the ferrous chloride is permitted to remain in the reaction chamber in non-volatile condition, it tends to have a cementing effect upon the aluminum silicid material and prevent proper reaction between the latter and the hydrochloric acid. This is suitably accomplished by maintaining the supply of aluminum silicid material and regulating the flow of dry hydrochloric acid gas, the temperature in the retort being directly related to the rate of flow of the gas when sufficient aluminum silicid material is present.

In both of the cases above described, the volatile products of the reaction containing volatilized aluminum chloride, and any volatilized ferrous chloride which may be formed, pass out of the reaction chamber into the preliminary condenser 16, which is maintained at a temperature sufficient to condense the ferrous chloride, but not low enough to condense the aluminum chloride, this temperature being, preferably, 300° to 500° C. In this preliminary condenser the ferrous chloride is separated out and the vapors of aluminum chloride ($AlCl_3$) pass on to one or more condensers 17, 18 and 19, which are maintained at temperatures low enough, say, 160° C. or lower, to condense the anhydrous aluminum chloride from the remaining volatile and gaseous products. Any of the remaining uncondensed products may be withdrawn from the system through an outlet pipe 32 leading from the final condenser. The condensed products may be withdrawn from any of the condensers through the outlet or discharge openings 24.

The reaction may be maintained intermittently or continuously, the latter being preferred, the supply of aluminum silicid in the reaction chamber being replenished from time to time from the supply hopper 11 as the material in the reaction chamber is consumed by the reaction.

What I claim and desire to secure by Letters Patent of the United States is:—

1. The process which consists in subjecting aluminum silicid material to the action of dry hydrochloric acid gas under conditions causing a reaction between the same resulting in aluminum chloride.

2. The process which consists in subjecting aluminum silicid material to the action of dry hydrochloric acid gas under conditions causing a reaction between the same resulting in aluminum chloride, and conducting off and condensing the volatile aluminum chloride formed.

3. The process which consists in subjecting aluminum silicid material to the action of dry hydrochloric acid gas under conditions causing an exothermic reaction producing volatilized aluminum chloride, and recovering the aluminum chloride by fractional condensation.

4. The process which consists in heating a chamber to at least a red temperature by means of combustible materials, displacing products of combustion from the chamber, depositing aluminum silicid material in said chamber, causing dry hyrdochloric acid gas to react with said material to produce volatilized aluminum chloride, and recovering the aluminum chloride by condensation.

5. The process which consists in subjecting material comprising aluminum silicid material to the action of dry hydrochloric acid gas under conditions causing an exothermic reaction resulting in aluminum chloride and at a temperature volatilizing other chlorides, and separating the aluminum chloride from the other volatile chlorides by fractional condensation.

6. The process which consists in subjecting material comprising aluminum silicid to the action of dry hydrochloric acid gas under conditions causing an exothermic reaction resulting in aluminum chloride, regulating the supply of the reacting materials so as to maintain a temperature at which other chlorides formed will volatilize, and separating the aluminum chloride from the other chlorides by fractional condensation.

7. In a process of generating aluminum chloride at elevated temperatures at which aluminum chloride and iron chloride are produced, separating the aluminum chloride from the iron chloride by fractional condensation.

In testimony whereof I have hereunto signed my name.

LOUIS BURGESS.